US007752173B1

(12) United States Patent
Gole

(10) Patent No.: US 7,752,173 B1
(45) Date of Patent: Jul. 6, 2010

(54) METHOD AND APPARATUS FOR IMPROVING DATA PROCESSING SYSTEM PERFORMANCE BY REDUCING WASTED DISK WRITES

(75) Inventor: Abhijeet Gole, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 315 days.

(21) Appl. No.: 11/305,578

(22) Filed: Dec. 16, 2005

(51) Int. Cl.
 *G06F 7/00* (2006.01)
(52) U.S. Cl. .................... 707/654; 711/135; 709/219
(58) Field of Classification Search ............. None
 See application file for complete search history.

(56) References Cited

U.S. PATENT DOCUMENTS

| 6,820,098 | B1* | 11/2004 | Ganesh et al. ............ 707/202 |
| 2002/0136410 | A1* | 9/2002 | Hanna ........................ 380/277 |
| 2002/0184444 | A1* | 12/2002 | Shandony .................. 711/118 |
| 2005/0144202 | A1* | 6/2005 | Chen .......................... 707/205 |

* cited by examiner

*Primary Examiner*—Pierre M Vital
*Assistant Examiner*—Truong V Vo
(74) *Attorney, Agent, or Firm*—Blakely, Sokoloff, Taylor & Zafman LLP

(57) ABSTRACT

Data with a short useful lifetime are received and cached by a system. The system waits for the first to occur of two events. If the first event is a local cache flush trigger, the data is written to a longer-term storage subsystem. If the first event is a remote cache flush trigger, the data is discarded. Systems and methods to benefit from this procedure are described and claimed.

11 Claims, 8 Drawing Sheets

METHOD AND APPARATUS FOR IMPROVING DATA PROCESSING SYSTEM PERFORMANCE BY REDUCING WASTED DISK WRITES

FIELD OF THE INVENTION

The invention relates to data storage management. More particularly, the invention concerns techniques to improve performance of data processing systems by avoiding wasted work.

BACKGROUND

Data processing systems are often used to generate, manipulate or store large amounts of information. The information can frequently be grouped into different classes based on criteria such as its size, importance, frequency of access, and expected useful lifetime. For example, data to describe a frame of video may be fairly large, but may only be accessed once during the playing of a much longer media segment, and may only be valid for a fraction of a second, until the next frame is to be displayed. In contrast, data to describe the layout of partitions on a hard disk may be quite small, and only accessed once when a system is initialized, but may be exceedingly important: the system may be unable to start or function properly without correct information about the hard disk layout.

Deterministic behavior is often an important or essential characteristic of a data processing system, but even within a system that is designed to process data in a reproducible fashion, different classes of data can be earmarked for different treatment to improve the overall performance of the system. Frequently, a "normal" processing pattern can be identified and procedures designed to expedite the normal flow, while alternate procedures can be provided to maintain data integrity if abnormal or error conditions arise. Identification of opportunities to improve typical system operations without impacting overall data correctness is a continuing task.

SUMMARY OF THE INVENTION

A system caches ephemeral data in temporary storage, then waits for the first one of two different events to occur. If the first event to occur is a local cache flush trigger, then the ephemeral data is written to longer-term storage. If the first event to occur is a remote cache flush notification, then the ephemeral data is discarded without being written to longer-term storage.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
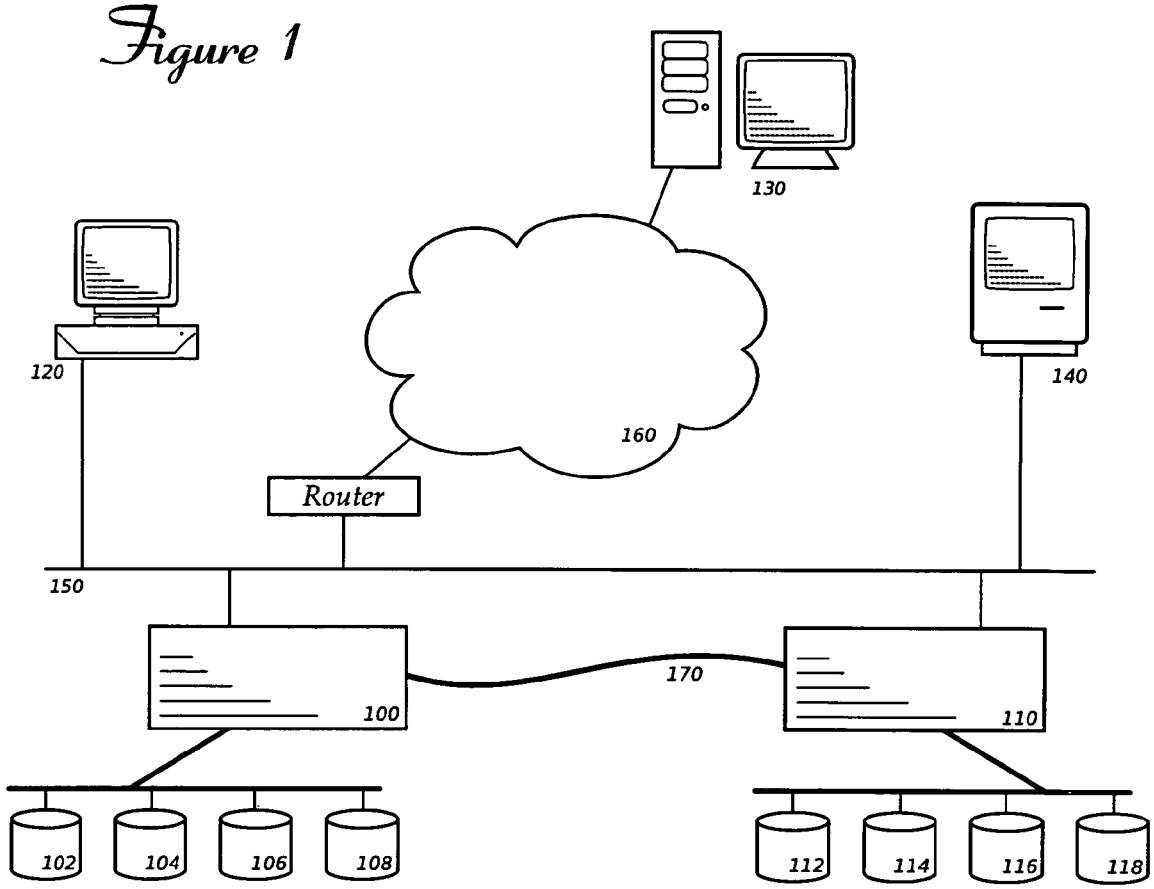
FIG. 1 shows an environment where an embodiment of the invention can be implemented.

A special class of system has been developed to serve the data storage needs of other computers efficiently. Systems of this class are often called "fileservers," although they can often provide data storage and retrieval services in units other than "files." This application will refer to such servers by the more generic name "storage servers," to highlight the fact that the techniques described herein may be used to improve the performance of other types of systems—for example, database servers—and not only fileservers.

A storage server may be a general-purpose system running software such as Data ONTAP® by Network Appliance, Inc. of Sunnyvale, Calif., that permits the system to respond to client requests to read or write data; a highly specialized system containing hardware, firmware and software to allocate and manage terabytes or petabytes of storage facilities, such as members of Network Appliance's fabric-attached storage ("FAS") product line; or something in between. Storage servers, and especially servers that manage large amounts of data and/or serve many clients, employ many techniques to improve their overall performance, since any improvement at the server may benefit every client. One well-known technique is to cache data to be stored in a fast, temporary memory before writing the data to slower mass storage subsystems. If the server responds to its client as soon as the client's data has been stored in cache memory, then the client need not wait for the slower disks. The server can schedule the writing of data from cache to disk ("cache flushing") at its convenience. For example, the server may wait until the disks are not engaged in reading or writing other data. The benefit of a cache is proportional to the length of time data stays there, since that is the amount of time saved for the client. However, cache memories may be of limited size, and may not store data as securely (with respect to power outages and other operational anomalies) as a mass storage subsystem, so the fileserver's cache flush control logic must balance several competing parameters to decide when to flush data to disk. Generally, flushing cache data when the cache utilization reaches a predetermined or configurable level, and/or when data in the cache reaches a predetermined or configurable age, provides reasonably good results.

Storage servers often incorporate hardware and/or software to protect against data corruption and loss occasioned by the failure of some of their hardware subsystems. For example, many storage servers record data on mass storage devices such as hard disks that are arranged as a Redundant Array of Independent Disks ("RAID"). Data stored on a RAID array or group of disks may be distributed among several mass storage devices so that the failure of one (or some) of the devices does not result in the loss of the data. Other techniques for protecting against various threats to data integrity are also known in the art.

One situation that a data storage facility may be unable to overcome is the loss or failure of the storage server itself. Although user data may be safely stored on, or recoverable from, the various mass storage devices, a failure of a storage server system that controls the mass storage devices may require a time-consuming hardware exchange or reconfiguration process. This down-time may be unacceptable in some applications. To avoid service interruptions during lengthy maintenance procedures, one or more redundant storage servers may be provided to replicate, or "mirror," the data on a primary, or "source" server. If the primary server becomes unavailable for any reason, one of the mirror servers can take its place until the primary server can be returned to operation.

The general idea of providing redundant systems to reduce the likelihood of a service interruption due to a catastrophic failure is well-known, but implementing redundant storage systems efficiently so that their basic service performance is not significantly degraded can be a more difficult proposition. For example, mirroring data on a redundant server implies transmitting the data from the source server to the destination (or "mirror") server, a process that may consume network bandwidth and processing capacity on both source and mirror servers. Input/output ("I/O") bandwidth on the mirror server is also used to store the data on a mass storage subsystem. When the mirroring is to be performed synchronously, more communication and processing may be required to ensure that the data is not only the same, but that it is the same at the same time. The types and quantities of mirror-related data flowing between primary and back-up systems in a synchronous, "1:1," or "SnapMirror®" implementation, present opportunities to streamline mirroring operations.

FIG. 1 shows an environment within which an embodiment of the invention can be used. Storage server 100 provides data storage services to clients 120, 130 and 140. Clients send requests and receive responses over a communication medium such as local area network ("LAN") 150 or wide-area network ("WAN") 160. A client request may be, for example, to store data, read data, or perform some other operation on a file or filesystem maintained by storage server 100. Storage server 100 stores client data on a storage subsystem such as hard disks 102, 104, 106 and 108, which may be configured and operated as a Redundant Array of Independent Disks ("RAID").

Element 110 is a storage server configured as a redundant backup "mirror" server for storage server 100, and is henceforth referred to as simply "mirror" 110. While storage server 100 is operating normally, mirror 110 maintains a copy of the client data on its storage subsystem (including, in this sample environment, hard disks 112, 114, 116 and 118). If storage server 100 fails or must be taken out of service, mirror 110 can take over its duties by beginning to receive and respond to client requests. In some environments, the switch from storage server 100 to mirror 110 can be accomplished without interrupting clients 120, 130 and 140.

The environment shown in this figure includes a separate communication channel 170 to carry data and control information between storage server 100 and mirror 110. This separate channel is not an essential part of an embodiment of the invention, but may offer performance advantages compared to transmitting the mirror data and control information over LAN 150.

In some environments, two or more redundant mirror servers may be provided; alternatively, one mirror server can maintain copies of client data for two or more source storage servers. The techniques described here can be extended to such environments by those of ordinary skill in the relevant arts.

Figure 2:
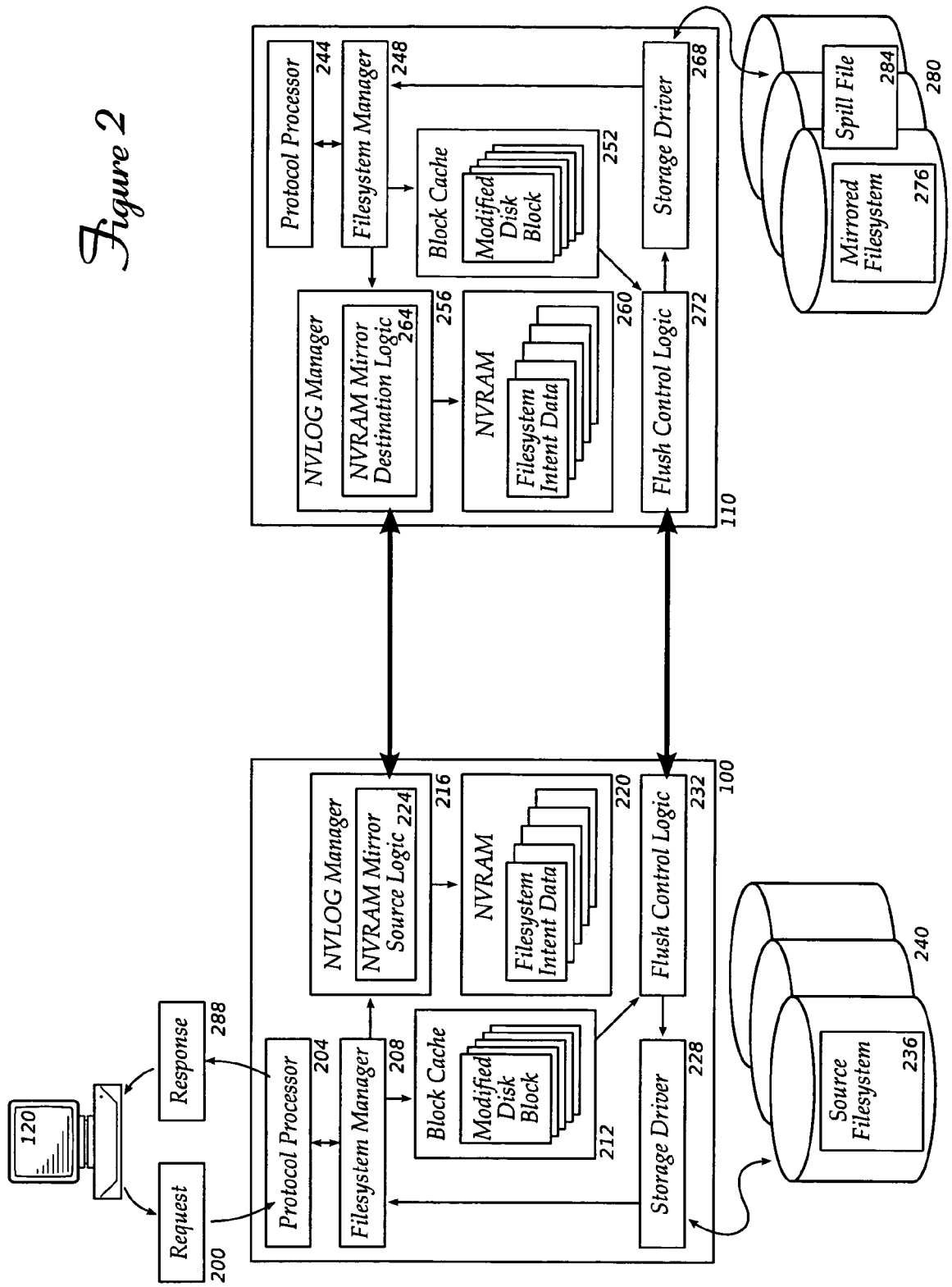
FIG. 2 is a block diagram of logical and physical elements that may participate in a method according to the invention.

FIG. 2 shows some logical and physical elements that interact in an embodiment of the invention. Client 120 is a client of storage server 100, and indirectly of mirror 110. Client 120 communicates with storage server 100 over a medium such as LAN 150 (see FIG. 1) to cause storage server 100 to store, manipulate, or retrieve data. For example, client 120 may send request 200 to storage server 100 to cause it to store data in source filesystem 236 on storage devices 240. Protocol processor 204 in storage server 100 interprets request 200 to determine what data is to be stored and where it should go. (This element is called a protocol processor because it can handle incoming client requests or commands in any of various different protocols, such as NFS, CIFS, HTTP, TCP/IP, etc.) The information from the protocol processor may be passed to filesystem manager 208, which is responsible for maintaining filesystem data structures so that files and free space can be administered on storage devices 240. Storage devices 240 contain source filesystem 236, and may contain other files and filesystems as well. Filesystem manager 208 may rely on storage driver 228 to perform low-level tasks such as reading and writing data on storage devices 240.

When filesystem manager 208 is instructed to make a change to filesystem 236, it may retrieve data blocks from storage devices 240, then modify those blocks and place them in block cache 212 to be written back to storage devices 240. Filesystem manager 208 may also interact with NVLOG manager 216, which keeps a record of the intended changes to filesystem 236 by storing information in non-volatile random access memory ("NVRAM") 220. The filesystem intent data in NVRAM 220 can help the system recover from a crash that occurs before all modified ("dirty") data blocks in block cache 212 have been written to disk. Filesystem intent data becomes irrelevant after the related modified disk blocks in block cache 212 have been written to storage devices 240. Flush control logic 232 manages the process of writing modified blocks in block cache 212 to their destinations on storage devices 240, a process called "flushing" the cache. Flush control logic 232 may flush block cache 212 when it fills to a predetermined (or configurable) level, when data in block cache 212 reaches a predetermined (or configurable) age, or when some other triggering event occurs. Flush control logic 232 may sort or order the modified data blocks when sending them to storage driver 228 to be written to achieve performance or other goals. For example, data blocks may be written in an order corresponding to their physical locations on storage devices 240, so that the devices are not required to perform as many time-consuming long seek operations (this ordering is commonly known as an "elevator" algorithm). Also, flush control logic 232 may group modified data blocks according to a shared attribute and write groups of blocks together.

Mirror 110 contains a number of logical and physical subsystems that are equivalent to those in storage server 100: protocol processor 244, filesystem manager 248, storage driver 268, block cache 252, NVLOG manager 256, NVRAM 260 and flush control logic 272. These elements permit mirror 110 to respond to requests from clients of its own (clients not shown here), or to requests from clients of storage server 100 if that system becomes unavailable. However, one of the elements shown in this figure differs between storage server 100 and mirror 110. Storage server 100 includes NVRAM mirror source logic 224, while mirror 110 contains NVRAM mirror destination logic 264. Basic storage server operations will be described with reference to FIG. 3, then a detailed example of the interactions between storage server 100 and mirror 110 (and, in particular, between NVRAM mirror source logic 224 and NVRAM mirror destination logic 264) will be discussed with reference to FIGS. 4 and 5.

Note that the modified disk blocks stored in block cache 212 (or 252) may contain data that is fundamentally different from the filesystem intent records stored in NVRAM 220 (260). Modified disk blocks may contain data to be stored for a client, or data that the storage server wishes to maintain for its own purposes. However, the filesystem intent records in NVRAM 220 (260) may describe the structure or meaning of information in the modified disk blocks. For example, a filesystem intent record may explain that a modified block contains new data being appended to a file or that it represents part of a directory after a file in the directory was renamed or deleted. This information about information, or "metadata," may be more important, in some sense, than the modified disk blocks, because without it, the storage server may be unable to locate, retrieve or process the disk blocks correctly. On the other hand, the intent records become obsolete once modified disk blocks to which they pertain are safely written to storage devices 240 (280). Thus, the filesystem intent records may be described as ephemeral: they become worthless after a known event occurs, and furthermore, the approximate time scale at which the event occurs is both known and relatively short. A system may benefit if it can avoid investing extra effort in such data, as long as safeguards are in place to protect the data in case the expected obsolescence is delayed or prevented by an abnormal condition. For example, a system may plan to flush modified data blocks to disk no less frequently than every thirty seconds, so the intent records are not expected to be useful for longer than thirty seconds. However, if a disk error or system crash delays the flush, the intent records may be invaluable in reconstructing the filesystem state from information available on the disks and in the block cache.

The filesystem intent records described here with reference to storage server operations are analogous to records describing database schema changes in a database server. For example, a record describing the creation or deletion of a file or directory within a filesystem is similar to a record describing the addition or deletion of a data table in a relational database management system ("RDBMS"). Continuing this analogy, data in a modified disk block may be like data describing a change in a field of a database record in a table, where the change does not affect the size of the record or its relationship with other records. In both sorts of storage servers, data about structural modifications is important to permit the server to interpret other data it has stored, but may become worthless after all the structural modifications have been committed to permanent storage. Of course, both filesystems and databases permit other types of modifications, and analogies may be extended to those as well. A file may be created, renamed, or destroyed, and similarly, a database table can be added or dropped (some database systems do not allow tables to be renamed). These modifications could also generate short-lived structural-change data with essential properties similar to the previously-discussed filesystem intent records.

Figure 3:
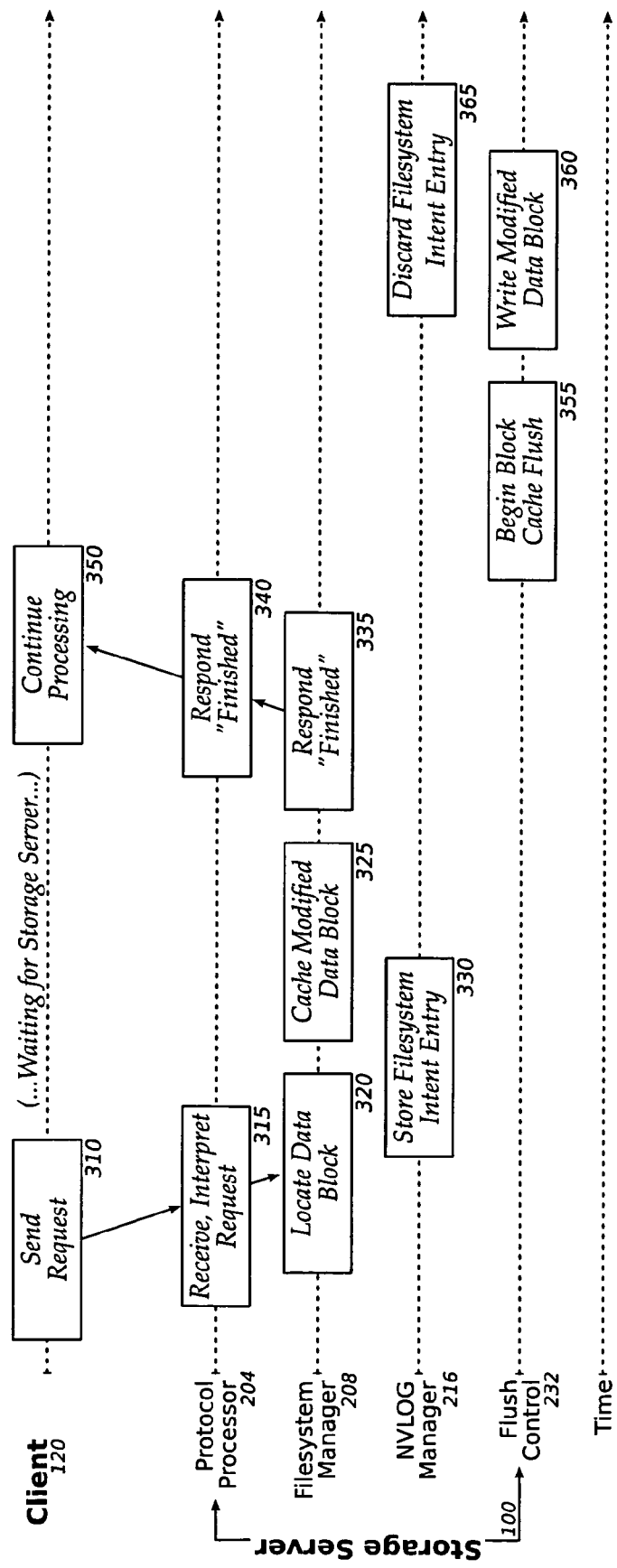
FIG. 3 shows a sequence of events involved in processing a client request to store information.

FIG. 3 shows an example of the basic operation of storage server 100 responding to a client "write" request. The operations are shown with time proceeding from left to right across the figure, and the left edge of each operational block indicates the approximate time at which the operation occurs. Thus, for example, operation 310 "Send Request" occurs before operation 315 "Receive, Interpret Request." First, client 120 transmits its request (310). Protocol processor 204 in storage server 100 receives and interprets the request (315), then passes relevant information to filesystem manager 208. Filesystem manager 208 locates a data block in the filesystem that is to be modified by the write request (320) and prepares a modified disk block in the block cache to contain the client's data (325). (If the write is of a partial data block, the filesystem manager may use storage driver 228 to retrieve the original block, then modify the original data appropriately.) The modified disk block will be earmarked so that flush control logic 232 will know where to write the block when it flushes the block cache. NVLOG manager 216 may make an entry in NVRAM 220 describing an intended filesystem change (330) if the client's request causes such a change. Finally, a "Finished" message is propagated back to the client (335, 340), and the client can continue its processing (350). Later, flush control logic 232 will start to flush the block cache (355) and the modified data block will be written to storage devices 240 (360). When any filesystem changes have been completed and the filesystem is in a consistent state, the filesystem intent data may be discarded (365). By responding to client 120 as soon as the data is stored in block cache 212 and NVRAM 220, storage server 100 allows the client to proceed with its operations (350) without having to wait for the cache flush to storage devices 240. Block cache 212 and NVRAM 220 serve as temporary "cache" memory to permit all the systems to proceed without having to wait for slower devices.

As storage server 100 receives and processes requests from its clients, it may accumulate a great deal of data about file and filesystem changes in block cache 212 and NVRAM 220. When block cache and/or NVRAM utilization reach a certain level, cache flush control logic 232 may cause storage server 100 to shift its operational priorities to flush the data to disk. Alternatively (or in addition), storage server 100 may flush data that has lingered in block cache 212 for longer than a configurable or predetermined period of time (i.e. the data has reached a certain age since it was stored in the cache). When there are no outstanding or pending write operations for a filesystem, the filesystem data as stored on storage devices 240 is in a consistent state, and storage server 100 is said to be at a consistency point ("CP"). At a CP, the storage devices could (theoretically) be disconnected from storage server 100, examined, and found to be completely up to date with respect to client operations performed before the CP (i.e. no further data remains in block cache 212 waiting to be flushed to disk). A CP may be identified by a timestamp or serial number so that successive "versions" of consistent filesystems may be placed in a correct order.

Figure 4:
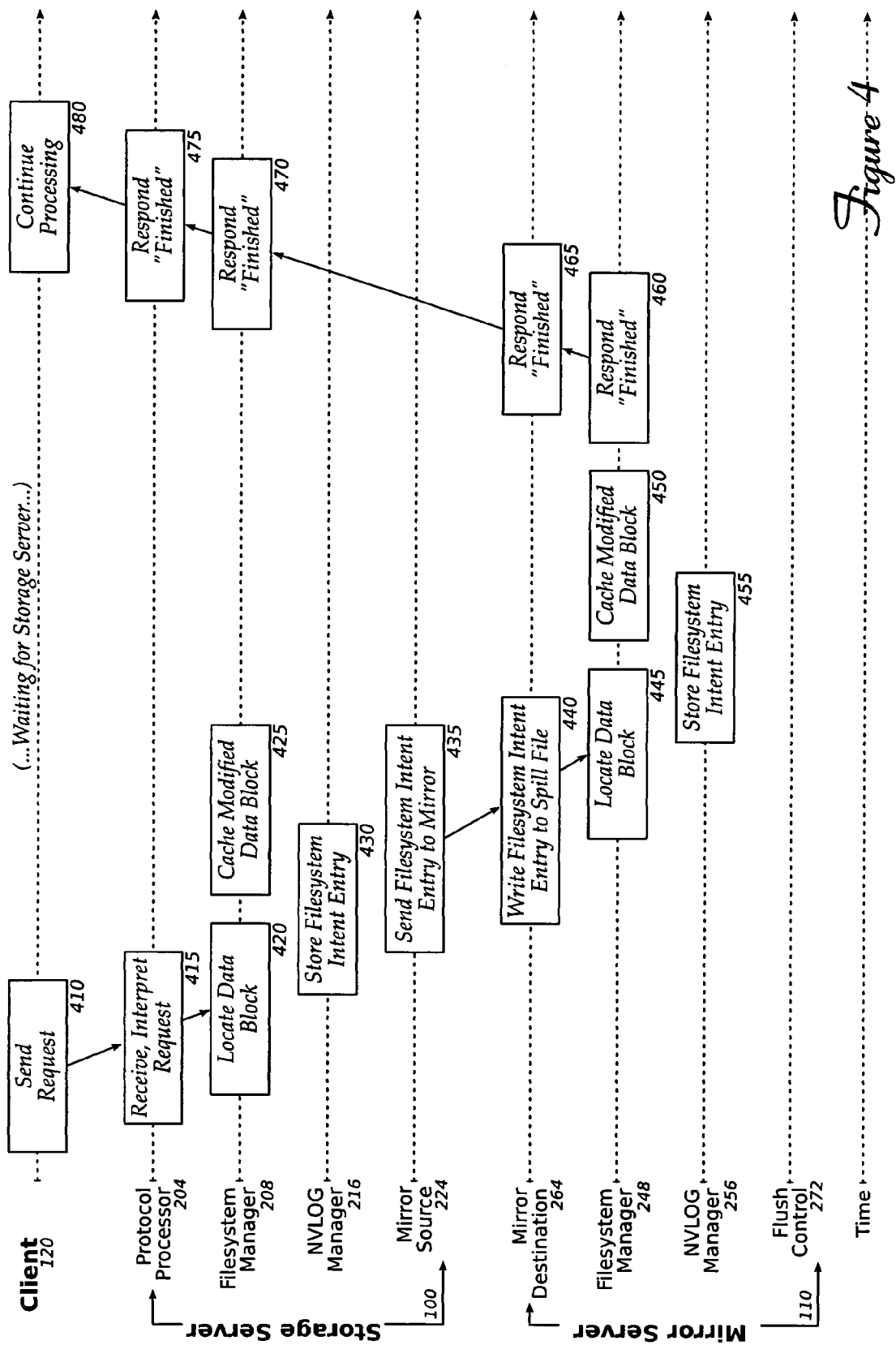
FIGS. 4 and 5 show a sequence of events involved in processing a client request to store information, when the information is to be synchronously mirrored on a second storage system.
Figure 5:
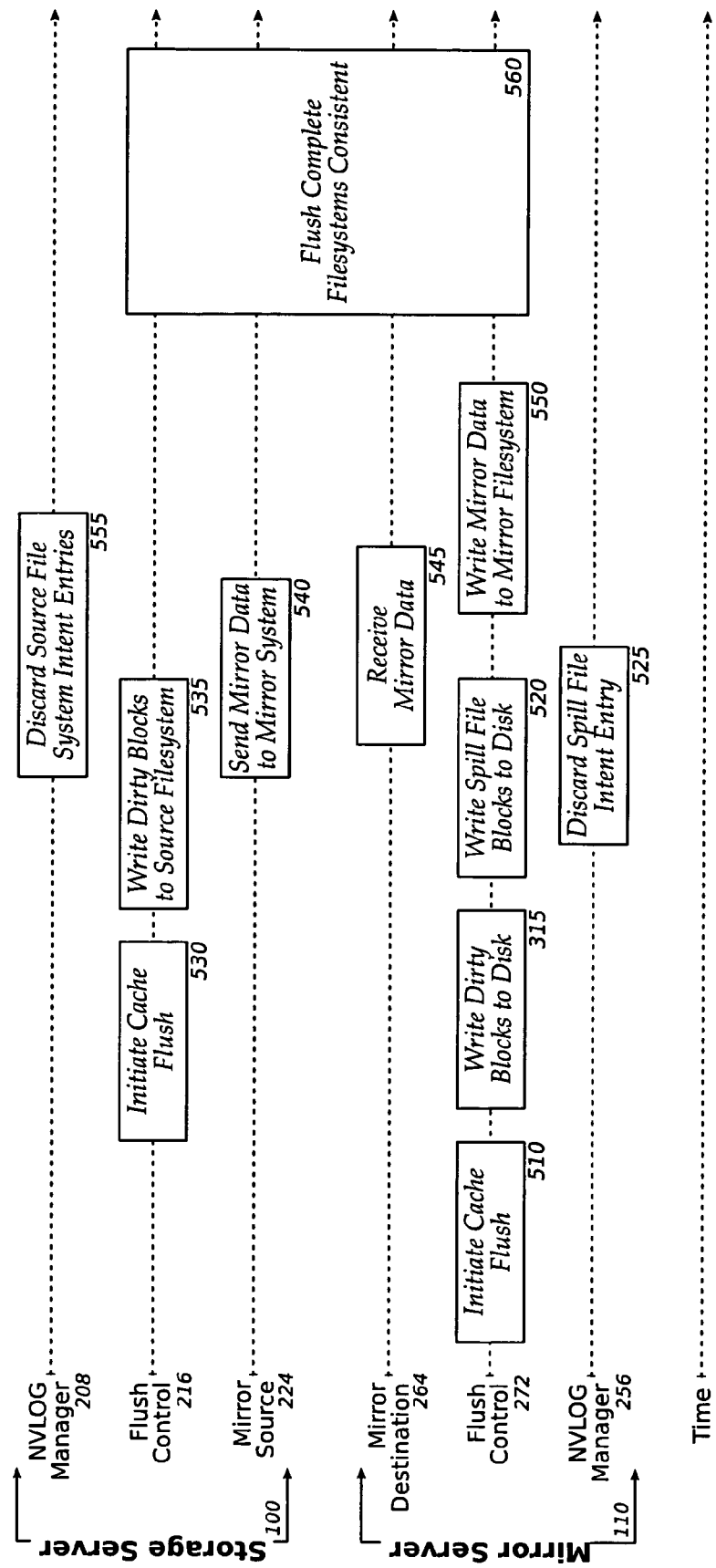

FIGS. 4 and 5 show how the operations of storage server 100 can be modified according to an embodiment of the invention so that the contents of source filesystem 236 are mirrored on mirror server 110. The mirror is synchronous with respect to consistency points. That is, when storage server 100 reaches a consistency point, the mirrored filesystem 276 on mirror 110's disks 280 is also at the same CP. In these figures also, time proceeds from left to right, and the left edges of operational blocks indicate the relative order in which operations may occur.

As in the previous example, client 120 sends a request to storage server 100 (410). The storage server's protocol processor 204 receives and interprets the request (415) and passes relevant information to filesystem manager 208, which locates a data block to be modified by the request (420). Then, filesystem manager 208 prepares a modified data block containing the client's new data and places the block in block cache 212 (425), earmarking the block for storage in the source filesystem 236. NVLOG manager 216 makes an entry describing the source filesystem change in NVRAM 220 (430).

Now, NVRAM mirror source logic 224 sends the filesystem intent entry to NVRAM mirror destination logic 264 in mirror 110 (435), so that mirror 110 will know of the intended changes to source filesystem 236. Mirror 110 will eventually have to make a similar change to mirrored filesystem 276. The modified data blocks corresponding to the intended changes could also be transmitted to mirror 110 at this time, although in the embodiment being described, they are not.

NVRAM mirror destination logic 264 in mirror 110 maintains a "spill file" 284 to contain filesystem intent data it receives from storage server 100, so that those entries are protected against loss if mirror 110 encounters operational difficulties. So, destination logic 264 issues an internal "write" request to store the newly-received intent entries to spill file 284 (440), and filesystem manager 248 locates data blocks (445) and prepares modified data blocks in block cache 252 (450), just as it would in response to a client request. The modified data blocks are earmarked for storage in spill file 284. Similarly, NVLOG manager 256 may create a filesystem intent entry in NVRAM 260 to describe the changes to the spill file (455). The various modules propagate a "Finished" message back to client 120 (460-475), and the client can continue its processing (480).

This example interaction continues in FIG. 5. At the time indicated by the left ends of the dashed lines, both storage server 100 and mirror 110 have outstanding data in their respective block caches, waiting to be flushed to disk. In the embodiment described here, storage server 100 has outstanding data to be written to source filesystem 235, but mirror 110 has outstanding data to be written to spill file 284, and not to mirrored filesystem 276. The outstanding data for the spill file describes intended changes to the mirrored filesystem, but may not include the modified data blocks themselves. That data may arrive later, when storage server 100 flushes its block cache 212 to disk at a consistency point: data that is to be mirrored may be transmitted to mirror 110 and written to mirrored filesystem 276 then.

Referring to FIG. 5, flush control logic 272 in mirror 110 is shown starting to flush its cache (510). Dirty blocks in block cache 252 are written to disk (515), and at some point the dirty blocks destined for spill file 284 will be written (520). After the spill file blocks are written, NVLOG manager 256 may discard any spill file intent entries in NVRAM 260 (525). Independently, and (in this example) slightly after mirror 110 begins its flush, flush control logic 216 in storage server 100 also starts to flush its block cache 212 (530). Dirty blocks, including blocks containing data for source filesystem 236, are written to disk (535). When a block is written to source filesystem 236, mirror source logic 224 sends the same data to mirror destination 264 so that mirror 110 can store the same data in mirrored filesystem 276 (540). Mirror destination 264 receives the data (545) and arranges for it to be written to disk (550). After storage server 100 and mirror 110 have flushed their block caches, each server's filesystems will be consistent, and mirrored filesystem 276 will be identical to source filesystem 236.

However, note that mirror 110 wrote data to spill file 284 (520) that was soon obsoleted when mirror data arrived (545) and was written to disk (550). Just as writing the modified data blocks from block cache 212 to source filesystem 236 terminates the useful life of filesystem intent data in NVRAM 220, writing the mirror data to mirrored filesystem 276 terminates the useful life of the data in block cache 252 destined for spill file 284. If those blocks are (or were) written to spill file 284, the related processing and I/O operations are wasted. What is worse, flushing the spill file blocks may cause mirror 110 to re-read those blocks later, when new intent entries (for a subsequent CP cycle) arrive from source storage server 100. This extra writing, reading, and processing consumes resources that may be in short supply just when mirror 110's activities are dominated by maintaining mirror filesystem 276 for storage server 100. In extreme cases, mirror 110 may begin "thrashing," spending a great deal of time reading and writing obsolete or soon-to-be-obsolete data, and getting further and further behind in its primary mirroring duties.

Figure 6:
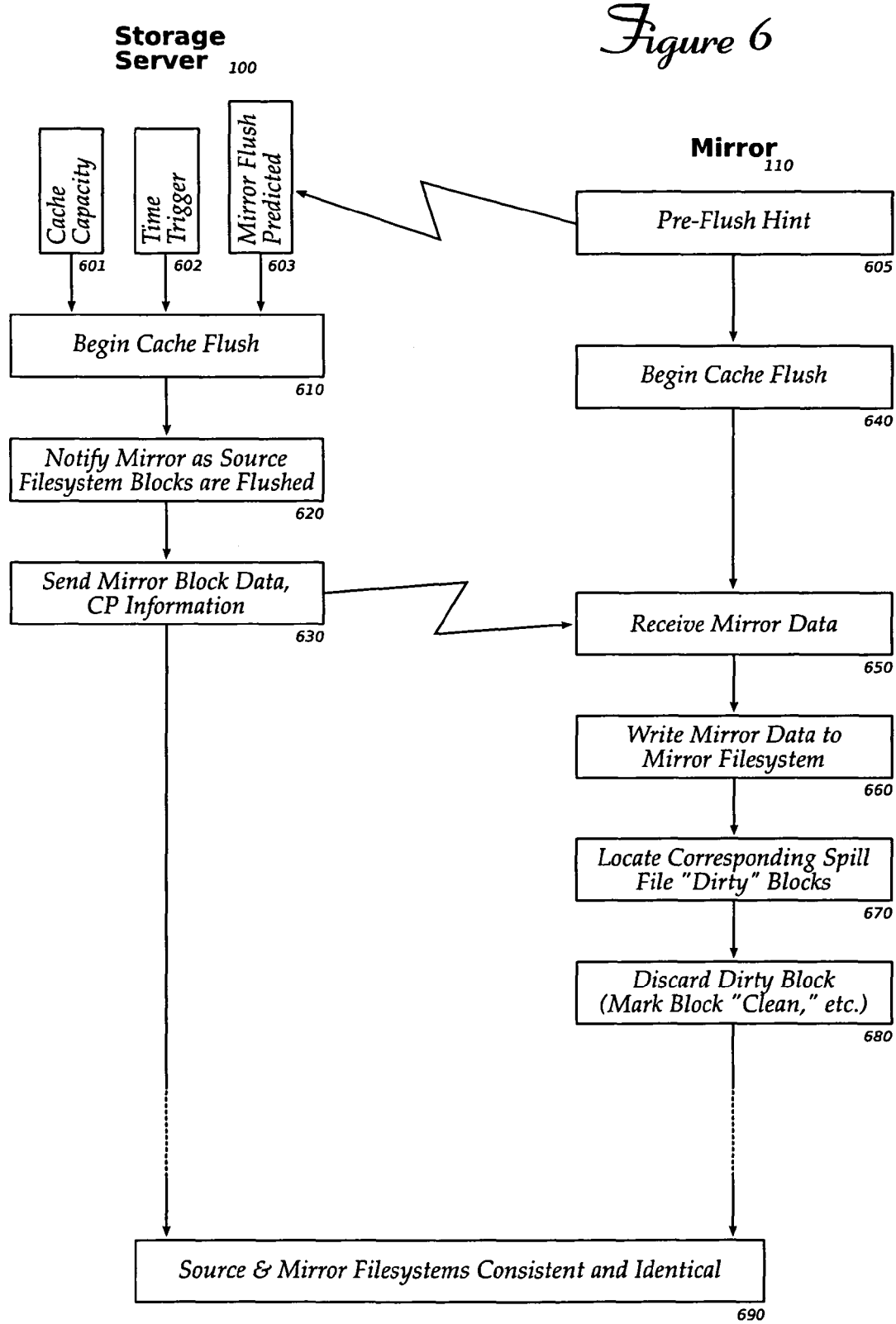
FIG. 6 is a flow chart to show how cache flush operations may be coordinated according to an embodiment of the invention.

FIG. 6 shows how storage server 100 and mirror 110 can cooperate to reach a consistency point together, with a lower risk of mirror thrashing. First, an event triggers a block cache flush for filesystem 236 on storage server 100. The event may be a block cache or NVRAM-capacity trigger (when block cache 212 or NVRAM 220 reach a predetermined or configurable portion of their capacity) (601), a time-based trigger (when data in block cache 212 reaches a predetermined or configurable age) (602), or it may be related to block cache or NVRAM capacity or content age on mirror 110 (603).

In one embodiment, storage server 100 may predict when mirror 110 will flush block cache 252 by tracking or estimating mirror 110's usage of its cache, for example, based on historical data from mirror 110. In another embodiment, mirror 110 may send a "pre-flush hint" signal to storage server 100 at a predetermined or configurable point before mirror 110 expects to flush its own block cache 252 (605). The conditions that cause mirror 110 to send a "pre-flush" signal may be different than those that cause mirror 110 to actually start its cache flush. For example, mirror 110 may send a signal when block cache 252 fills to 75% of capacity, but delay its actual flush until block cache 252 reaches 80% of its capacity. Similar age-based thresholds may apply: the pre-flush signal may be sent when a data block reaches a first age, while the flush may begin when the data block ages even further. Thus, the "pre-flush hint" signal may be sent before the mirror's cache flush begins. The actual thresholds and ages for pre-flush and flush events may be fixed by server control logic or may be configured by a system administrator or operator to adjust the server's operation for a particular performance profile.

In a preferred embodiment, flush control logic 232 in storage server 100 initiates a cache flush operation there when it predicts (or receives a signal to indicate) that mirror 110 is about to begin flushing block cache 252.

Storage server 100 begins to flush its block cache (610) by writing dirty data blocks therein to various locations on storage subsystem 240. During the flush, storage server 100 notifies mirror 110 as it flushes blocks from block cache 212 to source filesystem 236 (620). For example, storage server 100 may send block number, consistency point identification information, and/or the modified block data itself to mirror 110 (630).

When mirror 110 receives this data (650), it can update mirrored filesystem 276 appropriately (660), but it can also use the information to identify modified data blocks in block cache 252 that contain filesystem intent entries to be written to spill file 284 (670). The information from storage server 100 serves as an indication that the filesystem intent information may be discarded instead of written, so mirror 110 can discard the spill file blocks (mark them "clean," etc.) instead of writing them to the spill file (680).

Once storage server 100 and mirror 110 have flushed the dirty blocks in their respective block caches 212 and 252 to disk, source filesystem 235 and mirrored filesystem 245 will reach the same CP and be accurate copies of each other (690). By cooperating in this fashion, storage server 100 helps mirror 110 avoid writing obsolete (or soon-to-be obsolete) data to spill file 284, and the risk of thrashing may be reduced. In addition, mirror performance may be improved.

Even if mirror 110 begins its block cache flush before storage server 100 (as shown, for example, in FIG. 5), it can still reduce the risk of thrashing by prioritizing modified disk blocks for flushing. For example, by flushing blocks in block cache 252 that are not related to any mirrored filesystem before blocks that are related to a mirrored filesystem, mirror 110 can increase the chance that ephemeral mirror filesystem intent data will not have been flushed to spill file 284 when storage server 100 flushes the corresponding block from block cache 212 to source filesystem 236. Similarly, flush control logic 232 in storage server 100 can prioritize its flush so that blocks in block cache 212 that are to be stored in source filesystem 236 are written earlier, thus increasing the chance that the notification of flushed mirrored data will reach mirror 110 before the corresponding filesystem intent data block has been flushed to spill file 284. The reduction of thrashing risk and increased chance that short-lived data will not consume I/O bandwidth and processing resources depend on many factors with complex interrelationships. For example, the more non-mirror data mirror 110 has to flush to disk, the longer the intent/spill file data will remain in block cache 252, and the more likely it becomes that storage server 100 will flush the source filesystem 236 in time to allow mirror 110 to discard, rather than store, mirror intent data. The prioritization schemes outlined above, and further described in the following paragraphs, are compatible, so two storage servers implementing the same prioritization scheme can work together effectively. Any storage server can maintain a mirrored filesystem for any other storage server simply by scheduling flushes of non-mirror-intent modified data blocks before flushes of mirror-intent data blocks. There is no essential distinction between a storage server acting as a mirror source and one acting as a mirror destination, except that the source is the one that normally serves client requests. In other respects, the systems are equal peers. Each storage server may contain both mirror source logic and mirror destination logic so that it can fill either role.

Figure 7:
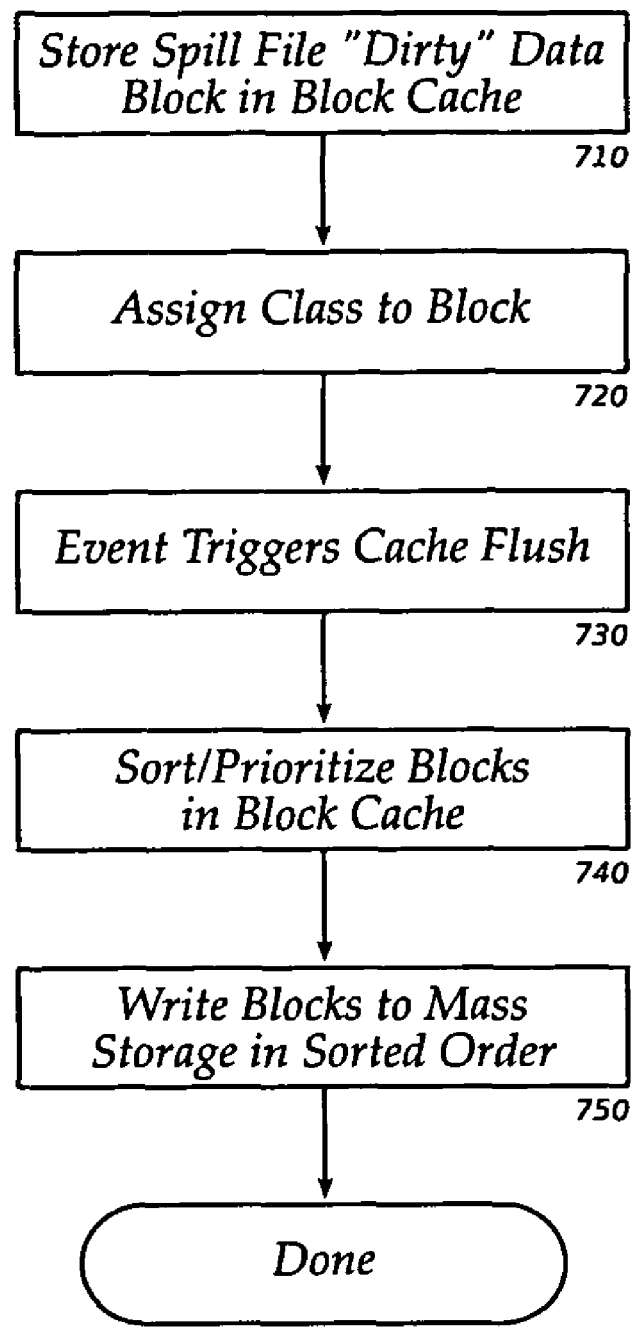
FIG. 7 outlines a method of optimizing a storage server's cache flush operations.

FIG. 7 illustrates the prioritization scheme: when a storage server places a modified data block in its block cache to await transfer to a mass storage subsystem (710), the block is assigned a class (720). One class may identify mirror-intent or spill-file-destined data, while another may identify non-mirror-intent data. Other classes may be established to indicate other characteristics of the data. When a flush-triggering event occurs (730), the data blocks in the block cache are sorted or prioritized by their class (740). As described above, the flush-triggering event could be that the block cache or NVRAM has filled to a predetermined level, that some data in the block cache has reached or exceeded a predetermined age, or that a cooperating mirror system signaled that it will flush its own block cache shortly.

Finally, the storage server writes the modified data blocks in its block cache to a mass storage subsystem in sorted or prioritized order (750), storing non-mirror-intent data before mirror-intent data. Within any particular class, blocks may be sorted according to a secondary parameter, such as destination on the mass storage subsystem. For example, the storage driver may schedule write operations according to an elevator algorithm so that the mass storage hardware can move from beginning to end (top to bottom, front to back, etc.) and back smoothly, rather than jumping between storage locations randomly. If disk block numbers are correlated with physical disk position, then writes may be sorted in ascending or descending order of block numbers to implement the elevator algorithm. By storing non-mirror-intent data before mirror-intent data, the cache flush logic extends the time available to receive a remote flush indication from the source storage server, and increases the chance that the mirror intent data can be discarded instead of written to longer-term storage in the spill file.

The storage server and mirror operations described with reference to FIGS. 2-5 have been initiated by a client's request to write data to a file on a filesystem that is mirrored. However, other types of client requests can also result in data being written to the filesystem. For example, a client may create a new file, delete an existing file, or rename a file. All of these operations may cause information to be written to the source filesystem, and require it to be replicated on the mirrored filesystem. In addition, the storage server's internal operations may generate data that must be stored in the filesystem. All of these sources of filesystem content change can be handled by the methods discussed.

Figure 8:
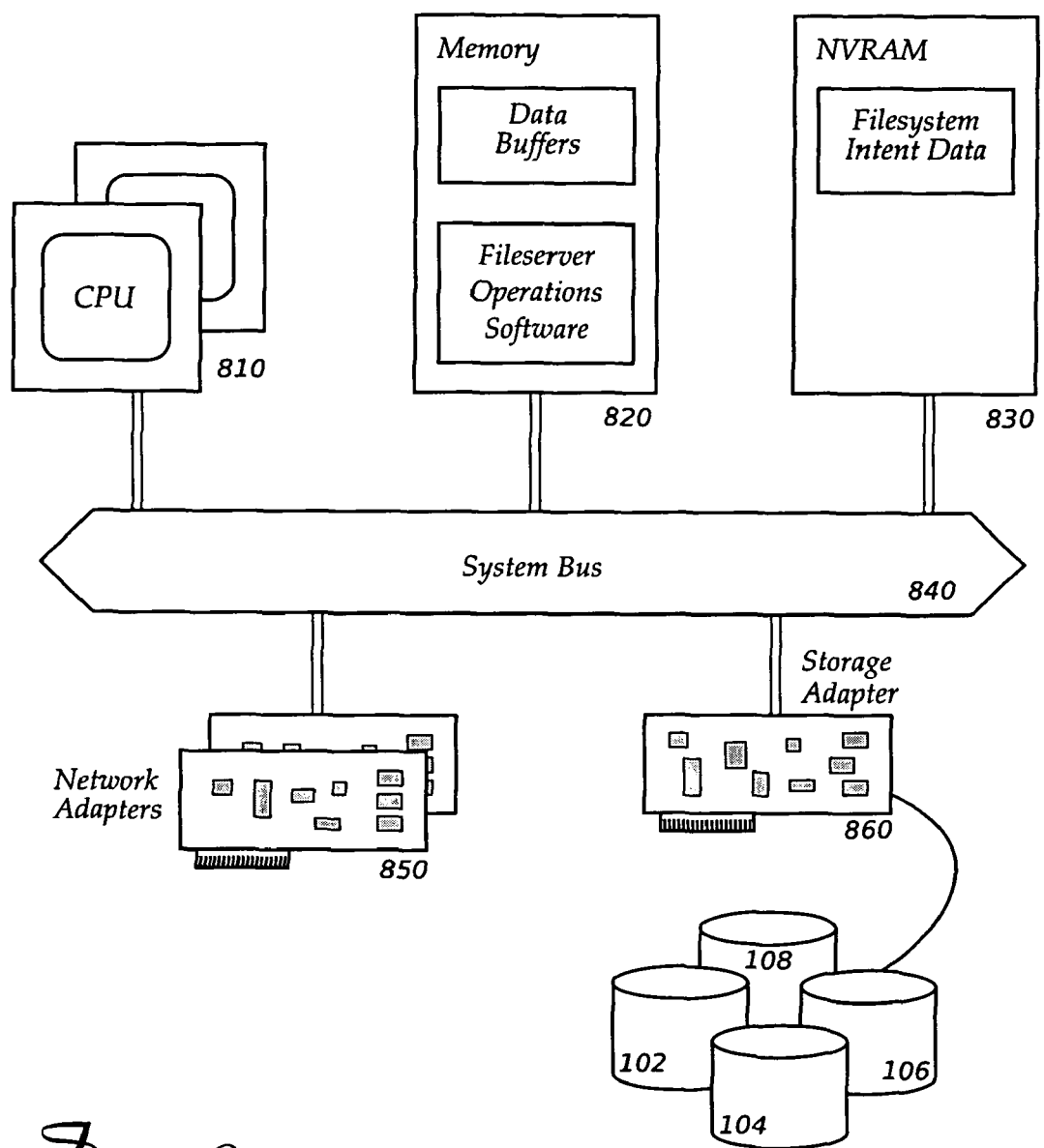
FIG. 8 shows components that may be present in a hardware system implementing an embodiment of the invention.

Storage servers that can implement an embodiment of the invention may include some or all of the elements shown in FIG. 8. One or more central processing units ("CPUs") 810 execute instructions to perform the methods described above. These instructions, as well as data buffers to hold data read from mass storage devices or received from a client, may be stored in memory 820. Nonvolatile Random Access Memory ("NVRAM") 830 may temporarily hold data to describe intended filesystem changes. Network adapters 850 are provided so that the system can communicate with its clients and with other storage servers. Storage adapter 860 performs signaling and data transfer tasks associated with moving data between mass storage devices such as disks 102, 104, 106 and 108 and memory 820. System bus 840 connects all the components and carries commands, messages and data between them.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that efficient synchronous filesystem mirroring can also be achieved by software and hardware that distribute the functions of embodiments of this invention differently than herein described. Such variations and implementations are understood to be encompassed according to the following claims.

I claim:

1. A method comprising:

receiving, by a mirror storage server, ephemeral data from a source storage server;

caching, by the mirror storage server, the ephemeral data in temporary storage in the mirror storage server, the ephemeral data to be stored in a spill file if the mirror storage server performs a cache flush;

monitoring a utilization of the temporary storage in the mirror storage server;

tracking an age of at least one data block in the temporary storage;

transmitting a cache flush hint message from the mirror storage server to a source storage server before performing the cache flush, wherein performing the cache flush comprises separating a plurality of data blocks in a block cache into a plurality of groups, one of the plurality of groups to contain the filesystem intent record, and writing the group that contains the filesystem intent record to a storage subsystem after writing a group that does not contain the filesystem intent record to the storage subsystem, wherein the cache flush hint message indicates to the source storage server that the mirror storage server will perform the cache flush and allows the source storage server to predict the cache flush on the mirror storage server, wherein the cache flush hint is transmitted when a utilization of the temporary storage reaches a first predetermined level, and wherein the cache flush commences in response to one of the utilization of the temporary storage exceeding a second predetermined level or the age of a data block in the temporary storage exceeding a third predetermined level;

waiting for an event to occur after the caching operation, where the event is one of a local cache flush trigger on the mirror storage server and a remote cache flush notification message, the message received from the source storage server, and wherein the ephemeral data is unnecessary if the remote cache flush notification message is the event, and wherein the remote cache flush notification message is sent by the second source storage server after a remote cache flush has occurred on the source storage server where data corresponding to the ephemeral data is written to a storage subsystem of the source storage server;

if the event is a local cache flush trigger, storing the ephemeral data in a storage subsystem of the mirror storage server; and if the event is a remote cache flush notification, discarding the ephemeral data.

2. The method of claim 1, wherein the local cache flush trigger is an occurrence of at least one of:
   a utilization of the temporary storage reaching a second predetermined level; and
   an age of an item in the temporary storage reaching a third predetermined time.

3. The method of claim 1, further comprising:
   separating a plurality of items in the temporary storage into a plurality of groups, one of the plurality of groups to include the ephemeral data; and
   storing the group that includes the ephemeral data after storing a group that does not include the ephemeral data.

4. The method of claim 1, wherein the ephemeral data comprises information to describe a database schema change.

5. The method of claim 1, wherein the ephemeral data comprises information to describe a filesystem structure change.

6. The method of claim 1, wherein the transmitting operation occurs in response to at least one of:
   the age of at least one data block in the temporary storage reaching a fourth predetermined level.

7. The method of claim 1, wherein predicting comprises:
   estimating a utilization of a cache memory on the mirror storage server; and
   predicting the cache flush when the estimated utilization reaches a fifth predetermined level.

8. A machine-readable storage medium storing instructions to cause a processor to perform operations comprising:
   receiving ephemeral data at a mirror storage server from a source storage server;
   caching the ephemeral data for storage in a storage subsystem associated with the mirror storage server, the ephemeral data to be stored in a spill file in the storage subsystem if the mirror storage server performs a cache flush;
   tracking a utilization of a block cache;
   monitoring an age of an item in the block cache;
   transmitting a cache flush hint message from the mirror storage server to the source storage server before performing the cache flush, wherein performing the cache flush comprises separating a plurality of data blocks in the block cache into a plurality of groups, one of the plurality of groups to contain the filesystem intent record, and writing the group that contains the filesystem intent record to a storage subsystem after writing a group that does not contain the filesystem intent record to the storage subsystem, wherein the cache flush hint message indicates to the source storage server that the mirror storage server will perform the cache flush and allows the source storage server to predict the cache flush on the mirror storage server, wherein the cache flush hint is transmitted when a utilization of the temporary storage reaches a first predetermined level, and wherein the flushing operation begins if the utilization of the block cache reaches a first threshold or if the age of the item reaches a second threshold;
   flushing the cache on the mirror storage server in response to a local cache flush trigger so that other data is flushed before the ephemeral data; and
   discarding the ephemeral data if a remote cache flush notification signal indicating that a remote cache flush has occurred on the source storage server is received before the ephemeral data is flushed, where in the remote cache flush, data corresponding to the ephemeral data is written to a storage subsystem associated with the source storage server.

9. The machine-readable storage medium of claim 8, wherein caching the ephemeral data comprises:
   generating a write request to store the ephemeral data in the spill file;
   preparing modified data blocks to be written to the spill file; and
   storing filesystem intent data describing modifications to the spill file in a non-volatile random access memory ("NVRAM").

10. The machine-readable medium of claim 8, containing additional instructions to cause the processor to perform operations comprising:
    tracking a utilization of the block cache on the source storage server; and
    initiating the cache flush if the utilization of the block cache on the source storage server reaches a third threshold.

11. A mirror storage server comprising:
    a processor coupled to a memory through a bus, the memory to cache filesystem intent data in temporary storage, the filesystem intent data to be stored in a spill file if the mirror storage server performs a cache flush;
    a storage subsystem to contain the spill file;
    a communication interface to receive filesystem intent data from a source storage server;
    cache flush logic to transmit a cache flush hint message to a source storage server before performing the cache flush, wherein performing the cache flush comprises separating a plurality of data blocks cache into a plurality of groups, one of the plurality of groups to contain the filesystem intent record, and writing the group that contains the filesystem intent record to a storage subsystem after writing a group that does not contain the filesystem intent record to the storage subsystem, wherein the cache flush hint message indicates to the source storage server that the mirror storage server will perform the cache flush and allows the source storage server to predict the cache flush on the mirror storage server, and wherein the cache flush hint is transmitted when a utilization of the temporary storage reaches a first predetermined level; and mirror destination logic to earmark the filesystem intent data for storage in the spill file and to discard the filesystem intent data if a remote cache flush notification message, received from the source storage server, precedes a local cache flush on the mirror storage server, the message indicating that a remote cache flush has occurred on the source storage server, where in the remote cache flush, data corresponding to the filesystem intent data is written to a storage subsystem in the source storage server; and cache flush logic to being the local cache flush if a utilization of the block cache exceeds a second threshold or if an age of an item in the block cache exceeds a third threshold.

* * * * *